United States Patent
Omata et al.

(10) Patent No.: US 6,441,855 B1
(45) Date of Patent: Aug. 27, 2002

(54) FOCUSING DEVICE

(75) Inventors: Kyoichi Omata, Tokyo; Toshiki Miyano; Manabu Kiri, both of Kanagawa, all of (JP)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/571,875

(22) Filed: May 9, 2000

(51) Int. Cl.$^7$ .................. G03B 13/00; H04N 5/232
(52) U.S. Cl. ....................... 348/356; 396/122
(58) Field of Search ................... 348/345, 349, 348/353, 354, 357, 350, 355, 356; 396/121, 122

(56) References Cited

U.S. PATENT DOCUMENTS

| | | | |
|---|---|---|---|
| 4,447,719 A | * | 5/1984 | Ogasawara .................. 396/122 |
| 5,341,170 A | * | 8/1994 | Takemot ..................... 348/354 |
| 5,410,383 A | * | 4/1995 | Kusaka et al.. .............. 396/122 |
| 6,130,716 A | * | 10/2000 | Hirasawa .................... 396/121 |

* cited by examiner

*Primary Examiner*—Wendy R. Garber
*Assistant Examiner*—Jason Whipkey
(74) *Attorney, Agent, or Firm*—Pamela R. Crocker

(57) ABSTRACT

A focusing device includes a movable focusing lens adapted to be moved to different positions, a conversion element for converting light incident on and transmitted through the focusing lens into a signal, and a lens driving mechanism for moving the focusing lens. The focusing device further includes a focus evaluation value calculation unit for calculating a focus evaluation value for each position of the focusing lens based on the signal from the conversion element, and a lens position specifying unit for specifying a position of the focusing lens causing a maximum focus evaluation value as an in-focus lens position. The lens driving mechanism moves the focusing lens in response to the in-focus lens position specified by the lens position specifying unit. The focus evaluation value calculation unit, in response to a plurality of observation areas, calculates a focus evaluation value through addition of partial focus evaluation values obtained for the respective observation areas, and weights the partial focus evaluation value for at least one of the plurality of observation areas on the basis of said signal to position the focusing lens.

8 Claims, 6 Drawing Sheets

FOCUSING DEVICE

BACKGROUND OF THE INVENTION

1. Field of the Invention

The present invention relates to a focusing device for use in imaging devices such as electronic still cameras.

2. Description of the Related Art

Conventional focusing devices for use in video cameras employ as a focusing method a so-called "hill climbing servo method". This servo method takes advantage of a property that in electric signals supplied from a photoelectric conversion element such as a CCD and a CMOS, the high-frequency component for an in-focus image tends to be greater than for an out-of-focus image. Therefore, according to this method, the image is determined as being in focus when the lens is in a position at which the high frequency component is maximum.

To determine the lens position where the amount of high frequency component is maximized, a focusing lens is moved in one direction either from an infinite far point or from the nearest point. In the course of such movement, a focus evaluation value, which is an indicator of the amount of high frequency component, is continuously calculated for a focus evaluation area defined in a part of the image. The lens is continuously moved as long as the focus evaluation value shows an increase. When a decrease in the focus evaluation value is detected, the value is regarded as having passed the peak, and the focusing lens is moved back to the position where the peak was achieved.

However, the amount of high frequency component is also affected by the inherent contrast of an object; An object with a lower contrast includes a smaller amount of high frequency component while an object with a higher contrast has more high frequency component. Thus, if the object has a low contrast, the peak cannot be easily detected by the above servo method, making it difficult to achieve accurate focusing. The method has another drawback that, when an object with a low contrast is located closer to the device and another object with a high contrast is located farther therefrom, the device is likely to focus on the object located farther therefrom.

SUMMARY OF THE INVENTION

An object of the present invention is to provide a focusing device that eliminates the effects of the high frequency component resulting from inherent object contrast and ensures accurate focusing.

According to one aspect of the present invention, a focusing device includes a movable focusing lens adapted to be moved to different positions, a conversion element for converting light incident on and transmitted through the focusing lens into a signal, a lens driving mechanism for moving the focusing lens, a focus evaluation value calculation unit for calculating a focus evaluation value for each position of the focusing lens based on the signal from the conversion element, and a lens position specifying unit for specifying the position of the focusing lens causing the focus evaluation value to be maximum as an in-focus lens position. The lens driving mechanism moves the focusing lens to the in-focus lens position specified by the lens position specifying unit. The focus evaluation value calculation unit uses a plurality of observation areas, and adds partial focus evaluation values obtained for respective observation areas to calculate the focus evaluation value. When adding the partial focus evaluation values, the focus evaluation value calculation unit weights the partial focus evaluation value for at least one of the plurality of observation areas based on the signal to position the focusing lens.

In this aspect, when the focus evaluation value calculation unit has calculated a focus evaluation value for each position of the focusing lens based on the signal from the conversion element, the lens position specifying unit specifies the focusing lens position causing the maximum focus evaluation value as the in-focus lens position. The lens driving mechanism moves the focusing lens to the in-focus lens position specified by the lens position specifying unit, to thereby achieve focusing. During this operation, the focus evaluation value calculation unit uses a plurality of observation areas, and calculates the focus evaluation value by adding partial focus evaluation values obtained for respective observation areas. Further, at such addition, the unit weights the partial focus evaluation value for at least one of the plurality of observation areas on the basis of said signal, so that the partial focus evaluation value for the observation area that is especially suited for focus evaluation is regarded as important. As a result, accurate focusing can be ensured even when the object has a low contrast, or when a plurality of objects of different types having different contrasts are present.

According to another aspect of the present invention, the focus evaluation value calculation unit detects, based on outputs of a plurality of unit areas in an observation area, respective maximum outputs of the unit areas, and calculates a partial focus evaluation value for the observation area by dividing a sum of the maximum outputs of the unit areas in the observation area by a sum of outputs of the plurality of unit areas in the observation area.

According to this aspect, as described above, the focus evaluation value calculation unit detects, based on outputs of the plurality of unit areas in an observation area, respective maximum outputs of the unit areas, and obtains a partial focus evaluation value for the observation area by dividing a sum of the maximum outputs of the unit areas in the observation area by a sum of outputs of the unit areas in the observation area. Consequently, object contrast in the observation area can be sharply detected irrespective of the illuminance of the object, and precise focusing can be achieved, even when the object contrast is low. Further, even when brightness changes as the focusing lens moves (for example, when an image is gradually clouded, or when a fluorescent light flickers), such adverse effects can be eliminated.

According to a still another aspect of the present invention, the focus evaluation value calculation unit corrects, to a prescribed value, a maximum of the partial focus evaluation values calculated for respective observation areas and respective positions of the focusing lens, and corrects the partial focus evaluation values other than the maximum in accordance with the ratio of said correction.

According to this aspect, a maximum of the partial focus evaluation values calculated for respective observation areas and respective positions of the focusing lens is corrected to a prescribed value, and also the partial focus evaluation values other than the maximum are corrected in accordance with the ratio of said correction, as described above. As a result, the partial focus evaluation values successively calculated as the focusing lens moves between the nearest point and the infinite far point are normalized as a ratio of the maximum corrected to the prescribed value, even when each observation area has a different illuminance. Therefore, according to this embodiment, changes in partial focus evaluation values for the respective observation areas detected as the focusing lens moves can be simply compared, and the observation area having the partial focus evaluation value exhibiting a considerable change, i.e. the observation area to be regarded as important for focusing, can easily be identified regardless of the difference in illuminance between the observation areas.

In a focusing device according to a further aspect of the present invention, when a minimum of the corrected partial focus evaluation values is large, an evaluation weight for the related observation area is reduced.

As described above, according to this aspect, the evaluation weight for the observation area is reduced when a minimum of the corrected partial focus evaluation values is large. When a minimum of the partial focus evaluation values successively calculated as the focusing lens moves and normalized as a ratio to a maximum corrected to the prescribed value is large, a difference between the minimum and the maximum is small, that is, change in the partial focus evaluation value observed as the focusing lens moves is small. Therefore, according to this aspect, observation areas as described above are weighted by a small amount, making possible correct identification of observation areas that should be regarded as important for focusing.

In the focusing device according to a further aspect of the present invention, when the partial focus evaluation value calculated for each of the plurality of observation areas and for each focusing lens position exhibits a large number of peaks as the focusing lens moves, the evaluation weight for the related observation area is reduced.

In this aspect, as described above, the evaluation weight for the observation area is reduced when the partial focus evaluation value calculated for each observation area and each focusing lens position exhibits a large number of peaks as the focusing lens moves. When the partial focus evaluation value shows a large number of peaks formed as the focusing lens moves, the likelihood of incorrectly identifying the focusing lens position by misidentifying a small peak as the maximum value is great. Therefore, the focusing device of this aspect enables correct identification of the observation area for focusing by weighting observation areas as described.

According to a further aspect of the present invention, the focusing device further includes a band pass filter for filtering component of the incident light in accordance with frequency. When the low frequency component of the incident light is filtered by the band pass filter and the maximum of the partial focus evaluation values calculated based on the filtered output is small, evaluation weight is reduced for the partial focus evaluation value calculated based on the output obtained by filtering high frequency component of the incident light with the band pass filter.

According to this aspect, as described above, when the maximum of the partial focus evaluation values calculated based on the output obtained by filtering low frequency component of the incident light with the band pass filter is small, the evaluation weight is reduced for the partial focus evaluation value calculated based on the output obtained by filtering high frequency component of the incident light with the band pass filter. It is empirically understood that, when the partial focus evaluation value does not show clear peaks when the low frequency component is filtered, correspondence between the peak in the partial focus evaluation value based on the output obtained by filtering the high frequency component and the in-focus position of the focusing lens is not reliable. Therefore, the focusing device according to this embodiment enables correct identification of the observation area in this manner.

DESCRIPTION OF THE PREFERRED EMBODIMENT

A preferred embodiment of the present invention will next be described with reference to the accompanying drawings.

Figure 1:
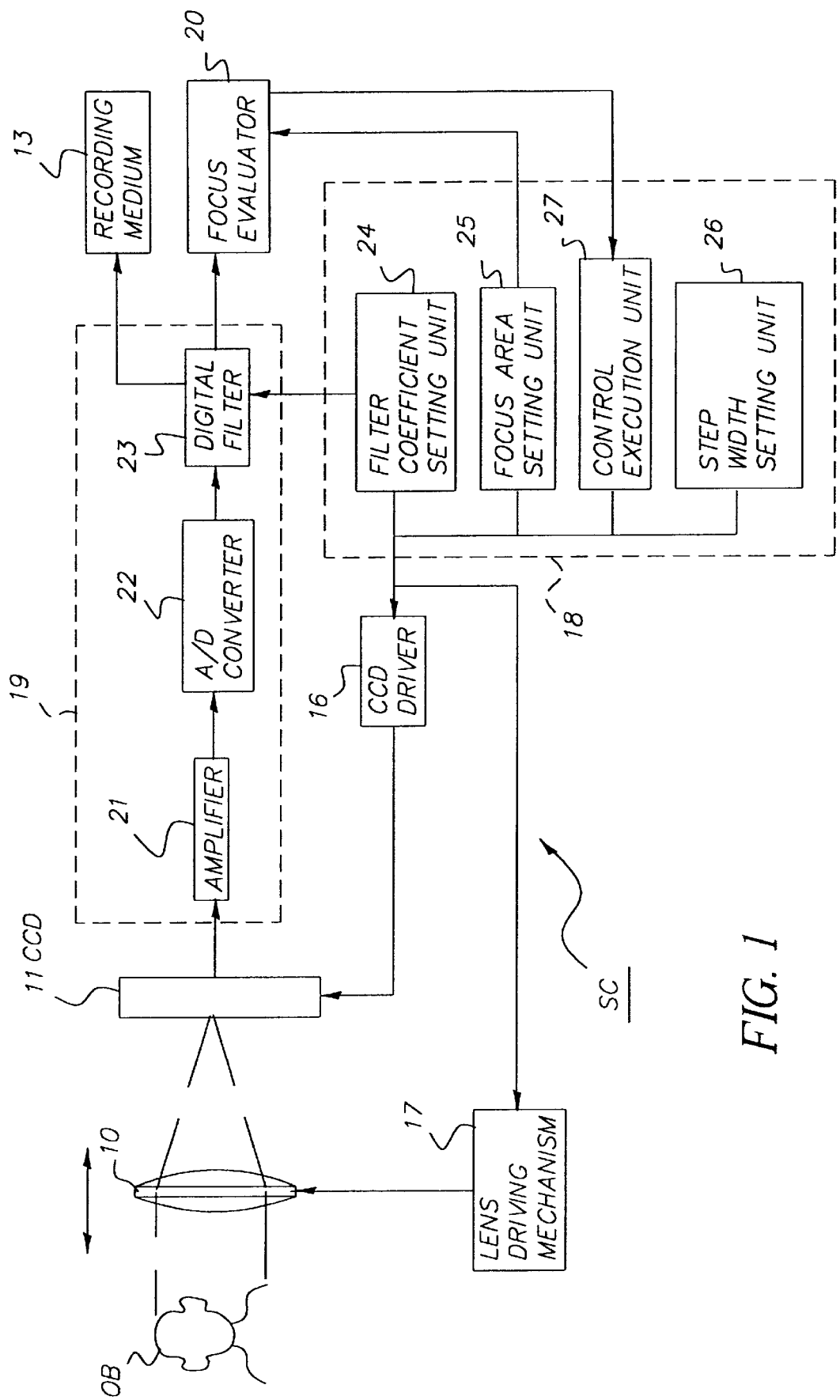
FIG. 1 shows an overall configuration of an electronic still camera employing a focusing device according to an embodiment of the present invention.

FIG. 1 shows an overall configuration of an electronic still camera incorporating an auto-focusing device of the present invention. The electronic still camera SC includes a focusing lens 10 for capturing an object OB at an appropriate lens position, and a CCD 11 serving as a photoelectric conversion element for converting an image formed through the focusing lens 10 to electric signals in accordance with the illuminance of the image. The CCD 11 has a color filter (not shown) attached thereto. The image captured by the CCD 11 is digitized by an A/D converter 22 and the like in a signal processing unit 19, and recorded in a recording medium 13 such as a memory card.

A CCD driver 16 for the photoelectric conversion element supplies driving signals to the CCD 11. A lens driving mechanism 17 formed by a motor, a gear mechanism, and the like, which are not shown in the drawings, moves the focusing lens 10 in and out (closer to and farther from the CCD 11) along the optical axis of the lens 10. A controller 18 having a microcomputer as the main component includes a ROM, a RAM, and the like (not shown), and controls the device including the CCD driver 16 and the lens driving mechanism 17.

Under control of the controller 18, the CCD 11 provides, in accordance with the driving signals supplied from the CCD driver 16, a current with a magnitude corresponding to the image giving illuminance to each pixel, thus producing a serial signal sequence. The signal sequence output from the CCD 11 is provided to a focus evaluator 20 via the signal processing unit 19. The focus evaluator 20 calculates a focus evaluation value representative of the amount of high frequency component contained in the signal sequence. The controller 18 controls the CCD driver 16 and the lens driving mechanism 17 to move the focusing lens 10 to the position where the focus evaluation value reaches its maximum.

The signal processing unit 19 includes an amplifier 21 for amplifying electric signals supplied from the CCD 11, an A/D converter 22 for linearly converting the amplified electric signals to digital signals, and a digital filter 23 for filtering the digital signals from the A/D converter 22 to pass the electric signals with a desired frequency band. The A/D converter 22 linearly converts light incident on the CCD 11 to digital signals. In accordance with the procedure described hereinafter, the digital values for the respective pixels filtered by the digital filter 23 are calculated by the focus evaluator 20 for the entire focus area FA (see FIG. 3) defined as a focus evaluation area, and the sum thus obtained is supplied as a focus evaluation value.

The controller 18 includes a filter coefficient setting unit 24 for setting a filter coefficient of the digital filter 23, a focus area setting unit 25 for defining part of the image as a focus area FA, and a step width setting unit 26 for changing, in association with the operation of the lens driving mechanism 17, a step width, i.e. an interval between the positions, of the focusing lens 10 as it moves. Operations of the filter coefficient setting unit 24, the focus area setting unit 25, and the step width setting unit 26 are controlled by a control execution unit 27 based on the focus evaluation value supplied from the focus evaluator 20.

Figure 2:
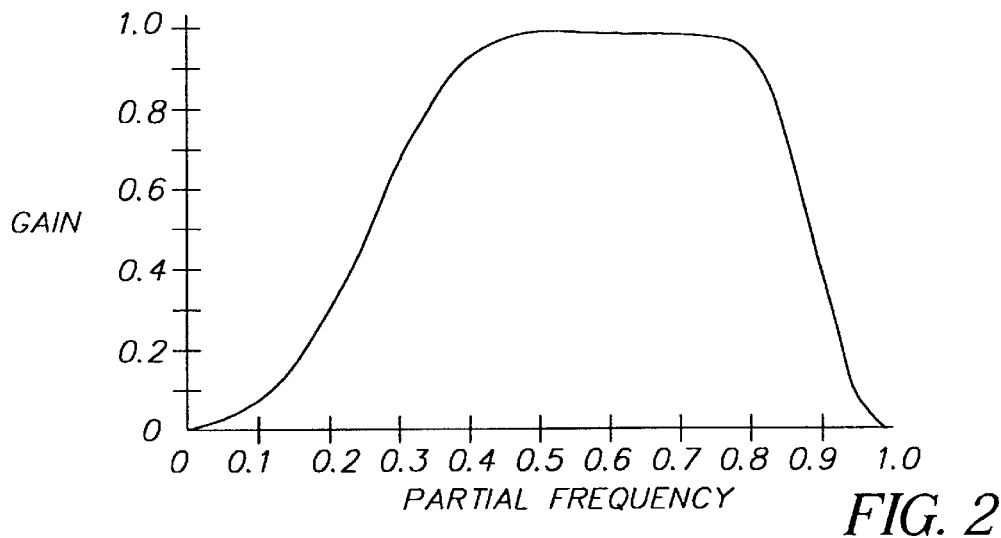
FIG. 2 is a graph showing characteristics of the output data passed through a wide pass filter.
Figure 3:
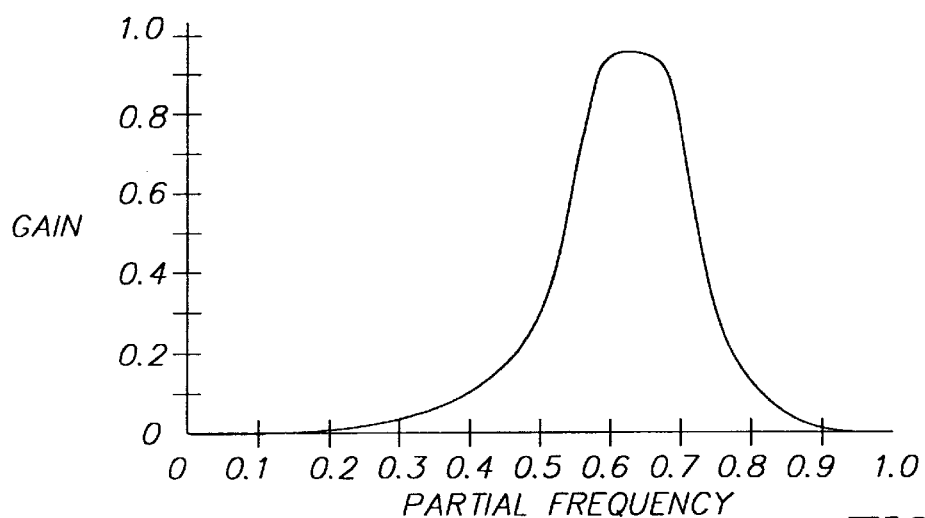
FIG. 3 is a graph showing characteristics of the output data passed through a high pass filter.
Figure 4:
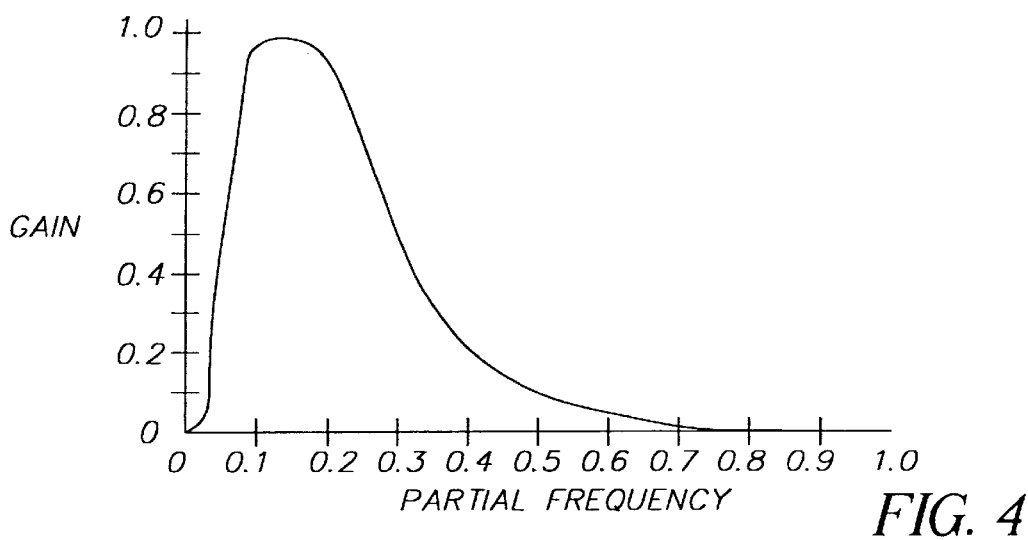
FIG. 4 is a graph showing characteristics of the output data passed through a low pass filter.

The filter coefficient setting unit 24 sets a filter coefficient of the digital filter 23 as desired, to thereby change the characteristics, i.e. a pass band, of the digital filter 23. For example, when the digital filter 23 is formed by two secondary IIR (infinite impulse response) systems connected in a cascade connection, the digital filter 23 can operate as a wide pass filter, a high pass filter, or a low pass filter, having frequency characteristics as shown in FIG. 2, FIG. 3, and FIG. 4, respectively, by appropriately setting the coefficient of each multiplier provided in the filter. The filter coefficient setting unit 24 may include a table having preset filter coefficients required for obtaining desired frequency characteristics.

Figure 5:
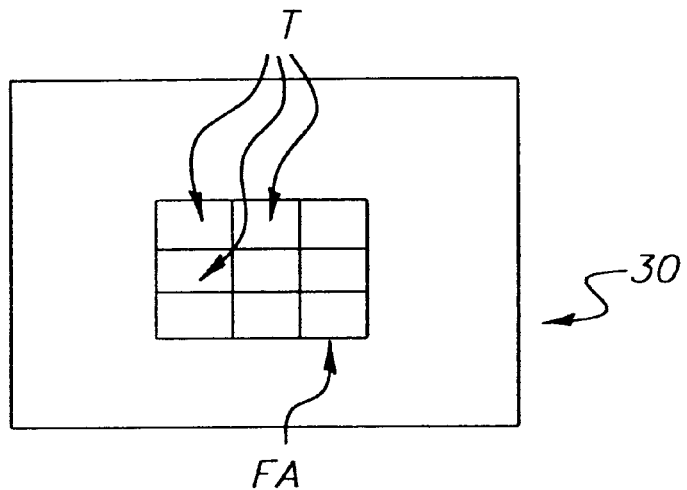
FIG. 5 schematically shows an arrangement of a focus area and tiles in an image screen.

The focus area setting unit 25 controls the focus evaluator 20 to extract only the signals corresponding to the pixels in focus area FA from the signal sequence. Referring to FIG. 5, the focus area FA defined at the center of an image screen 30 is further divided into nine "tiles" T (i.e. blocks that are obtained by dividing the focus area) in three rows and three columns used as observation areas. Such a division is performed by, for example, a clock counter for pixels. As described hereinafter, for each tile T are assigned weight coefficients WL1, WL2, WH1, WH2, and WH3. While only one focus area FA is defined at the center of the image screen in this embodiment to facilitate understanding of the invention, alternatively a plurality of focus areas FA can be defined.

Operation of the focusing device structured as described above according to the present embodiment will next be described with reference to the flow chart shown in FIG. 6. The description below is of the processing after the step width setting unit 26 determines the step width for the focusing lens 10 based on the depth of focus detected by the depth-of-focus detection unit.

First, with the focusing lens 10 placed at an infinite far position, a driving output is provided to the CCD 11 from the controller 18 through the CCD driver 16, to thereby capture an image (SI). Signals supplied from the CCD 11 are amplified by the amplifier 21 and then digitized by the A/D converter 22. When the color filter of the CCD 11 is laid out in a primary color Bayer arrangement, the order of the output signal is:

GRGR
BGBG
GRGR
BGBG wherein R, G, and B denote red, green and blue, respectively.

When the color filter is a complementary color filter, the output signal order will be either:

YCYC
MGMG
YCYC
MGMG or

YCYC
MGMG
YCYC
GMGM wherein C, M, Y, G respectively denote cyan, magenta, yellow, and green. Luminance information is obtained from only the G pixel information when the signal is in a primary color Bayer arrangement, while it is obtained by adding two horizontally adjacent pixels for a complementary color filter.

Next, a partial focus evaluation value for each tile T is calculated with the current lens position using the thus obtained luminance information (S2). The process for calculating the partial focus evaluation value will be described below with reference to the flow chart shown in FIG. 7.

Referring to FIG. 5, a sum D1 of the output data for each tile T is calculated (S11). The sum D1 increases as the luminance of the object becomes higher.

The output data is passed through a low pass filter and converted to an absolute value, a maximum value is obtained for each line in a tile T, and these maximum values are added for each tile T, to thereby obtain a sum DL1 (S12). The greater the maximum value obtained after the luminance signal from each line is passed through the low pass filter is, i.e. the more high frequency component is contained in that tile T (the more edges with a greatly changed contrast are present), the higher becomes the value of the sum DL1.

The sum DL1 obtained at the step S12 is divided by the sum D1 at the step S11 to obtain a partial focus evaluation value DL2 for each tile T (S13).

Similar operations are performed for the high frequency range. More specifically, an absolute value is obtained by passing the output data through a high pass filter and by converting the output data, and then maximums are obtained for each line in a tile T and added for each tile T to calculate a sum DH1 (S14). The sum DH1 is divided by the sum D1 obtained at the step S11 to calculate a partial focus evaluation value DH2 for each tile T (S15), thereby completing this routine.

Referring again to FIG. 6, determination is made as to whether or not the above-described calculation of the partial focus evaluation values has been repeated ten times (S3). When the determination is negative, the focusing lens 10 is moved by the step width determined by the step width setting unit 26 (S4), and the steps S1–S3 are repeated. Thus, the focusing lens 10 is moved stepwise from the infinite far position to the nearest position, and for each step of movement, the sums D1 and DL1, the partial focus evaluation value DL2, the sum DH1, and the partial focus evaluation value DH2 are calculated for each tile T. As an alternative to capturing the image after the focusing lens 10 stops moving as described above, the image may be captured ten times as the focusing lens 10 moves continuously. While the number ten is described in this embodiment, ten is merely an example, and the image may be captured any desired number of times. The number of images captured may also be determined in accordance with the depth of focus.

After the image is captured and calculation is performed ten times, the process advances to step S5. For ease of understanding, discussion below relates to an upper left tile T among the nine tiles T shown in FIG. 5. First, at the step S5, ten partial focus evaluation values DL2 and ten partial focus evaluation values DH2 calculated for this tile T are respectively divided by the maximum value of ten data items, and normalized so that the maximum attains a value of 1 (S5). The normalized partial focus evaluation values will be hereinafter referred to as FVL and FVH, respectively.

Next, operations are performed on the values FVL and FVH, to obtain weights WL1, WL2, WH1, WH2, and WH3 for use in calculation of the weighted sums described hereinafter (S6). Calculation of the weighting values will be discussed below.

[Calculation of the Weights WL1 and WH1]

Figure 8:
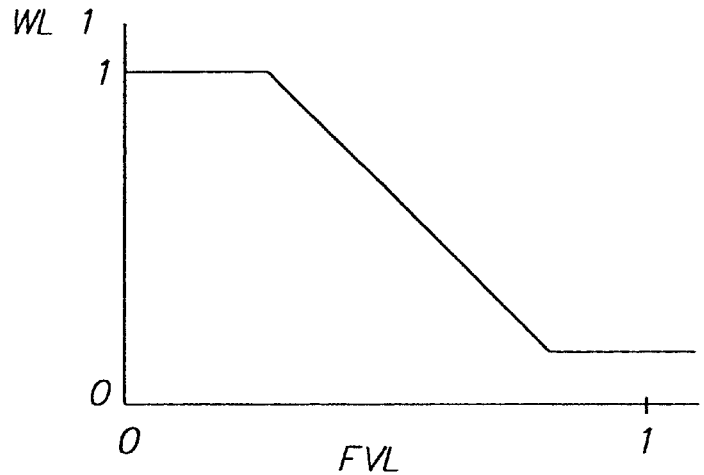
FIG. 8 is a graph related to a step of calculating a weight WL1.

The minimum of the ten normalized FVL is used as an index and the weight WL1 is determined based on this value. More specifically, the greater the minimum is, the smaller the weight WL1 is set (see FIG. 8). As the value FVL is obtained by normalization performed so that the maximum is 1, a large minimum value means a small difference between the maximum and the minimum, i.e. change in the partial focus evaluation value FVL with the movement of the focusing lens 10 is small. By weighting such tile T by a small amount, a tile T important for focusing can be correctly identified. For the value FVH as well, the minimum of the ten values is used as an index and the weight WH1 is determined based thereon.

[Calculation of the Weights WL2 and WH2]

The weight WL2 decreases as the partial focus evaluation value FVL calculated for each position of the focusing lens shows an increased number of peaks with the movement of the focusing lens 10. When there are a large number of peaks in the partial focus evaluation value FVL formed as the focusing lens 10 moves, the likelihood that the focusing lens position will be misjudged, causing a small peak to be viewed as the maximum value is great. Therefore, by thus weighting such tile T by a small amount, the tile to be regarded as important for focusing can be correctly specified.

Figure 9:
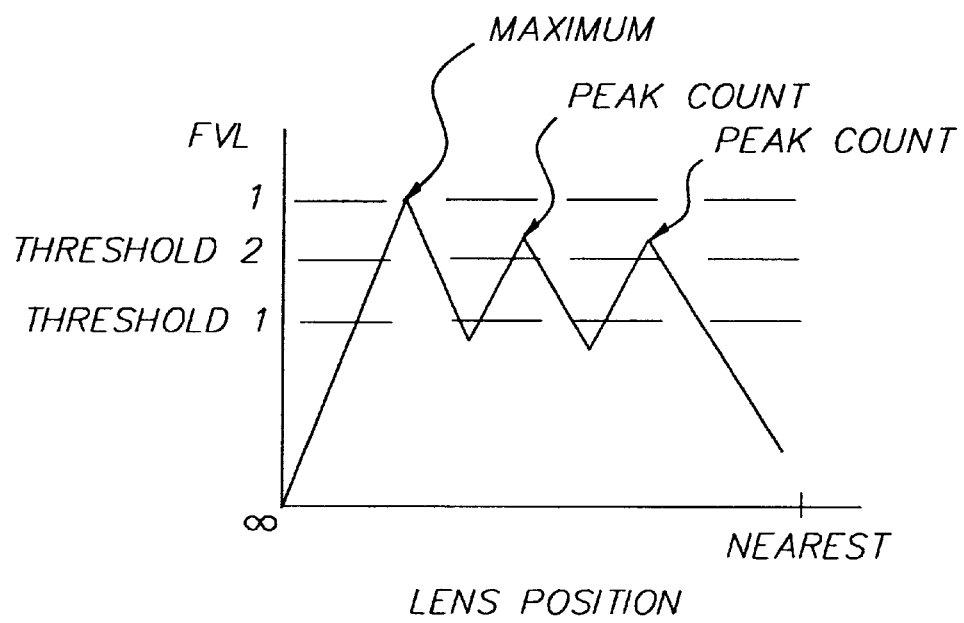
FIG. 9 is a graph related to a step of detecting a number of peaks in a partial focus evaluation value FVL to calculate a weight WL2.

Various methods are possible for detecting the number of peaks. An example is shown in FIG. 9. Referring to the graph in FIG. 9 illustrating the consecutive ten FVH values, when the FVH assumes the value of 1, drops below a Threshold 1, and then exceeds a Threshold 2, the number of peaks is counted as two. Thereafter, when the FVH drops below the Threshold 1 and exceeds the Threshold 2 again, the number of peaks is counted as three.

Figure 10:
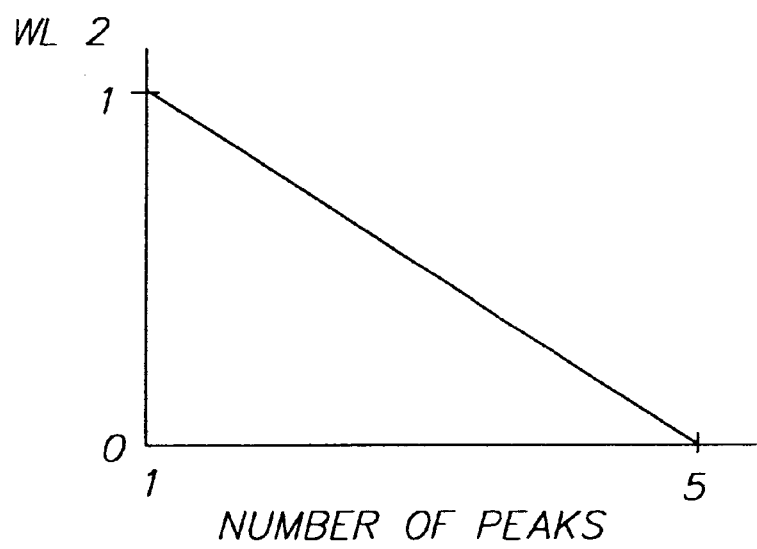
FIG. 10 is a graph related to a step of calculating a weight WL2.

The weight WL2 is determined such that it assumes a small value when a large number of peaks are observed (see FIG. 10). The weight WH2 is similarly designated for FVH.

[Calculation of the Weight WH3]

The weight WH3 is calculated based on the sum DL1 obtained at step S12. At this time, the weight WH3 is set smaller when the sum DL1 is below a predetermined threshold, namely, Threshold 3. Weight WH3 is set smaller because, when the sum DL1 for each tile obtained by adding maximum values for respective lines in a tile is small for the signal filtered by the low pass filter, a peak of the sum DL1 formed with movement of the focusing lens 10 cannot be clearly observed, and it is empirically understood that in such a case reliability of the correspondence between the peak of the partial focus evaluation value and the in-focus position of the focusing lens 10 is low for a signal filtered by a high pass filter. Therefore, by weighting such a tile T by a small amount, a tile T important for focusing can be correctly specified.

A weighted sum FV is calculated for each lens position using the thus obtained weights WL1, WL2, WH1, WH2, and WH3 in accordance with the following equation (S7).

$$FV = FVL*WL1*WL2 + FVH*WH1*WH2*WH3 \quad (1)$$

Thus, the weighted sum FV is obtained for the observed upper left tile T, and ten weighted sums FV are calculated for this tile by performing the above operation for the respective lens positions.

Further, similar operations are performed for respective tiles T, to thereby obtain the weighted sums FV for ten lens positions for each of the nine tiles T. The total sum of FVs ($FV_{total}$) for nine tiles are calculated for each of the ten lens positions in accordance with the following equation.

$$FV_{total} = \Sigma FV \quad (2)$$

Using the ten total sums $FV_{total}$ obtained for the respective lens positions as the focus evaluation values, the focusing lens position producing the maximum $FV_{total}$ is determined as the in-focus lens position (S8).

A lens driving output is applied to the lens driving mechanism 17 so that the lens 10 moves to the determined in-focus position (S9), and the routine is terminated.

As described above, according to the present embodiment, the focus area FA used as a focus evaluation area is divided into a plurality of tiles T, and a focus evaluation value is obtained by adding partial focus evaluation values DL2 and DH2 for respective tiles T, wherein the partial focus evaluation values DL2 (DH2) for a plurality of tiles T are weighted by the weights WL1, WL2, WH1, WH2, and WH3. As a result, the partial focus evaluation value DL2 (DH2) for the tile which is particularly suited for focus evaluation is selected from among a plurality of tiles T. This ensures focusing accuracy, even when the contrast of the object OB is low, or a plurality of different objects OB with varying contrasts are present.

Further, according to the present embodiment, based on outputs from a plurality of unit areas (respective lines) of the tile T, maximums are detected for the unit areas (respective lines) in an observation area (tile T), and the sum DL1 (DH1) of maximums for each tile T is divided by the sum D1 of the output data for that tile T to be used as a partial focus evaluation value DL2 (DH2) for that tile T. Accordingly, the contrast of the object OB can be sharply detected regardless of the illuminance of the object OB, and precise focusing can be achieved even when the contrast of the object OB is low. In addition, even when the brightness is not constant during the movement of the focusing lens 10 (for example, when the sky is gradually clouded or a fluorescent light flickers), adverse effects can be eliminated. Alternatively, the total sum of absolute values of outputs obtained through a high pass filter may be calculated for each tile T, or the thus obtained sum may be divided by brightness. Such methods also allow an appropriate partial focus evaluation value to be obtained, and are embraced within the scope of the present invention.

In addition, according to the present invention, the partial focus evaluation values DL2 (DH2) other than the maximum are normalized based on the maximum of the partial focus evaluation values DL2 (DH2) calculated for respective positions of the focusing lens (S5) for each of the tiles T. Thus, the partial focus evaluation values DL2 (DH2) successively calculated as the focusing lens 10 moves are normalized with respect to the maximum even when the tiles T have different illuminances. Consequently, changes in partial focus evaluation values DL2 (DH2) with the movement of the lens 10 for the respective tiles T can be simply compared regardless of the difference in illuminance between the tiles T, so that the tile T exhibiting a great change in partial focus evaluation value DL2 (DH2), i.e. the tile T that should be regarded as important for focusing, can be easily identified.

While all the tiles T in the focus area FA are weighted in the above example, it is also possible to configure the present invention such that only some of the tiles are weighted. As long as at least one of the plurality of tiles is weighted, effects unique to the present invention can be enjoyed.

Further, although the focus area FA is defined at the center of the image screen 30 as shown in FIG. 3 in this embodiment, the focus area FA may be defined at an arbitrary position of the screen 30, or may be defined as desired by a user or be automatically moved tracking a particular object OB. While the focus area FA is divided into nine tiles T in the above example, the focus area can be divided into any number of tiles T. Any structure in which a plurality of tiles T are provided as observation areas is embraced within the scope of the present invention.

While the above description relates to an electronic still camera SC, the present invention can be widely applied including in a video camera or in various other optical devices.

The invention has been described in detail with particular reference to certain preferred embodiments thereof but it will be understood that variations and modifications can be effected within the spirit and scope of the invention.

Figure 6:
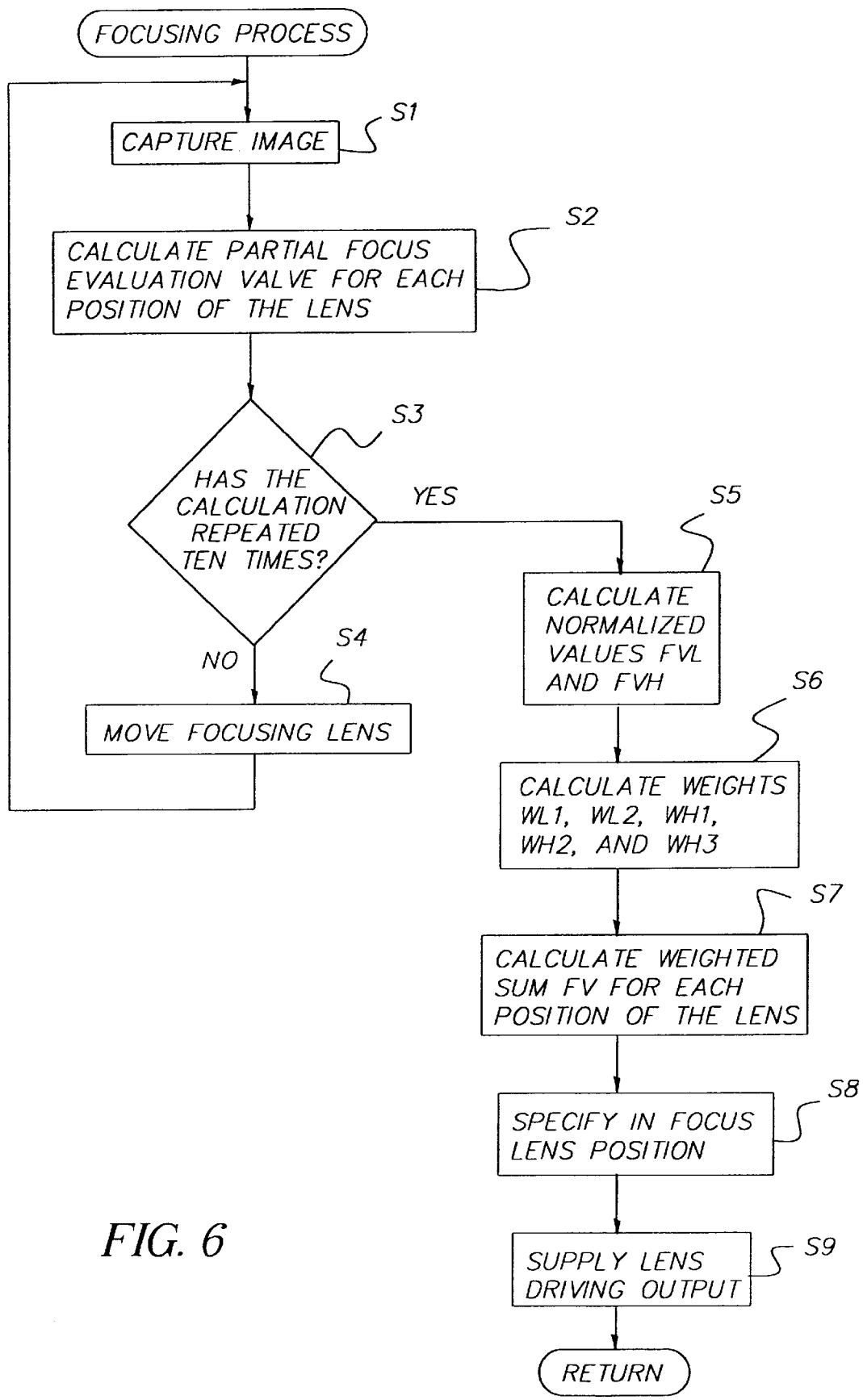
FIG. 6 is a flow chart illustrating a focusing process.

| Parts List | |
|---|---|
| FIG. 1 | |
| 10 | focusing lens |
| 13 | recording medium |
| 16 | ccd driver |
| 17 | lens driving mechanism |
| 18 | controller |
| 19 | signal processing unit |
| 20 | focus evaluator |
| 21 | amplifier |
| 22 | a/d converter |
| 23 | digital filter |
| 24 | filter coefficient setting unit |
| 25 | focus area setting unit |
| 26 | step width setting unit |
| 27 | control execution unit |
| FIGS. 2, 3, 4 | |
| 1 | gain |
| 2 | spatial frequency |
| 3 | wide type |
| 4 | nyquist rate |
| 5 | high type |
| 6 | low type |
| FIG. 5 | |
| 1 | tile |
| 2 | focus area |
| 3 | image screen |
| FIG. 6 | |
| 1 | focusing process |

Figure 7:
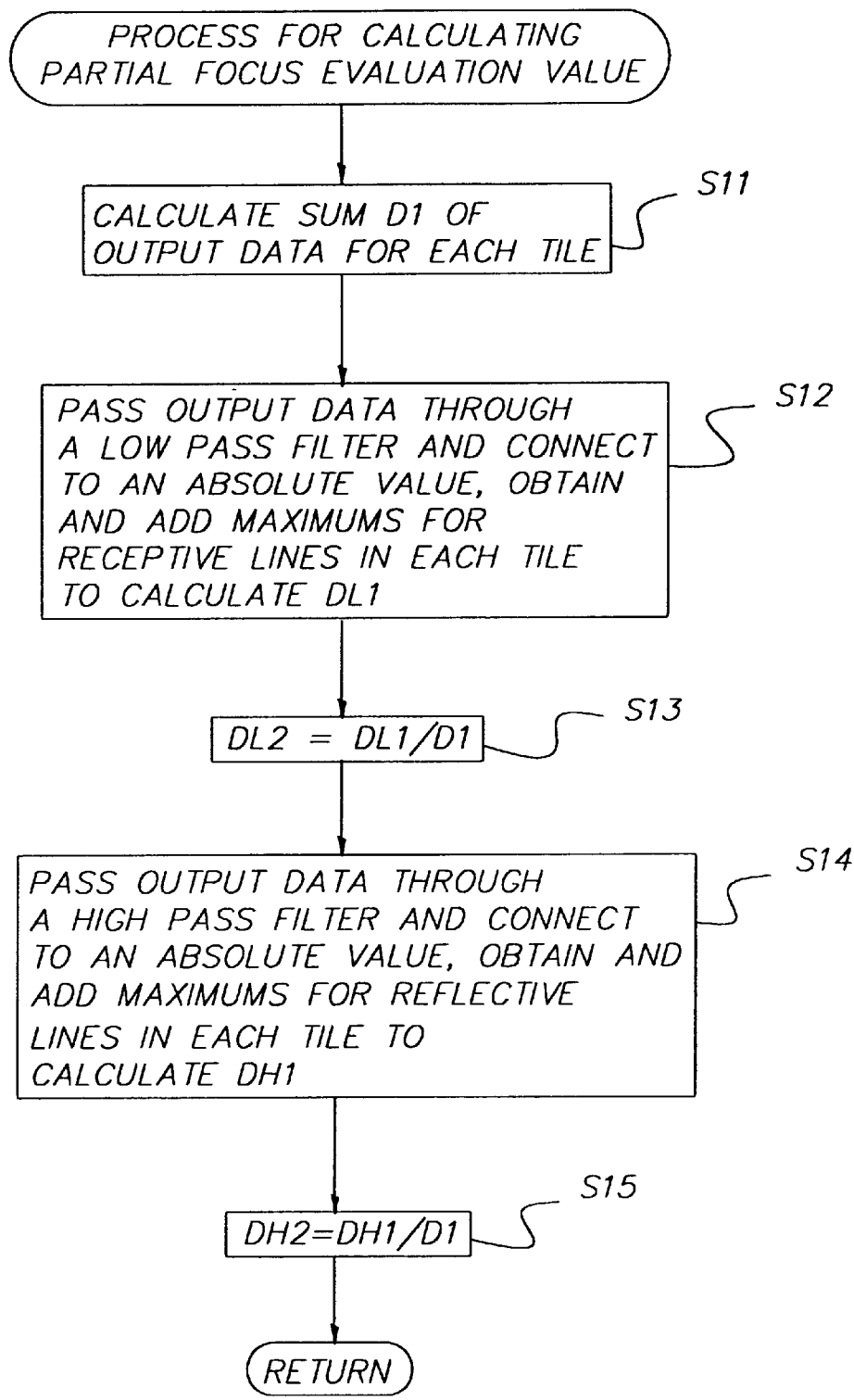
FIG. 7 is a flow chart illustrating a process for calculating a partial focus evaluation value.

| -continued | |
|---|---|
| Parts List | |
| S1 | capture image |
| S2 | calculate partial focus evaluation value for each position of the lens |
| S3 | has the calculation repeated ten times? |
| S4 | move focusing lens |
| S5 | calculate normalized values fvl and fvh |
| S6 | calculate weights w11, w12, wh1, wh2, and wh3 |
| S7 | calculate weighted sum fv for each position of the lens |
| S8 | specify in-focus lens position |
| S9 | supply lens driving output |
| 2 | return |
| FIG. 7 | |
| 1 | process for calculating partial focus evaluation value |
| S11 | calculate sum d1 of output data for each tile |
| S12 | pass output data through a low pass filter and convert to an absolute value, obtain and add maximums for respective lines in each tile to calculate d11. |
| S14 | pass output data through a high pass filter and convert to an absolute value, obtain and add maximums for respective lines in each tile to calculate dh1. |
| 2 | return |
| FIG. 9 | |
| 1 | maximum |
| 2 | peak count |
| 3 | lens position |
| 4 | nearest |
| FIG. 10 | |
| 1 | number of peaks |

What is claimed is:

1. A focusing device, comprising:

a movable focusing lens adapted to be moved to different positions;

a conversion element for converting light incident on and transmitted through said focusing lens into a signal;

a lens driving mechanism for moving said focusing lens;

a focus evaluation value calculation unit for calculating a focus evaluation value for each position of said focusing lens based on the signal from the conversion element; and a lens position specifying unit for specifying a position of said focusing lens causing a maximum focus evaluation value as an in-focus lens position;

said lens driving mechanism moving said focusing lens in response to the in-focus lens position specified by said lens position specifying unit; and said focus evaluation value calculation unit responsive to a plurality of observation areas, calculates a focus evaluation value through addition of partial focus evaluation values obtained for the respective observation areas, and weights the partial focus evaluation value for at least one of the plurality of observation areas on the basis of said signal to position the focusing lens, wherein said focus evaluation value calculation unit detects, based on outputs of a plurality of unit areas in said observation area, maximum outputs of respective unit areas, and calculates a partial focus evaluation value for said observation area by dividing a sum of the maximum outputs of said plurality of unit areas in said observation area by a sum of outputs of said plurality of unit areas in said observation area.

2. The focusing device according to claim 1, wherein said focus evaluation value calculation unit corrects, to a prescribed value, a maximum of the partial focus evaluation values calculated for the respective observation areas and respective positions of said focusing lens, and corrects the partial focus evaluation values other than the maximum in accordance with a ratio of said correction.

3. The focusing device according to claim 1, wherein said focus evaluation value calculation unit corrects, to a prescribed value, a maximum of the partial focus evaluation values calculated for the respective observation areas and respective positions of said focusing lens, and corrects the partial focus evaluation values other than the maximum in accordance with a ratio of said correction.

4. The focusing device according to claim 2, wherein an evaluation weight for the respective observation area is reduced when a minimum of the corrected partial focus evaluation values is greater than a predetermined value.

5. The focusing device according to claim 3, wherein an evaluation weight for the respective observation area is reduced when a minimum of the corrected partial focus evaluation values is greater than a predetermined value.

6. The focusing device according to claim 1, wherein an evaluation weight for the related observation area is reduced when the partial focus evaluation value calculated for each of said plurality of observation areas and for each position of said focusing lens exhibits a large number of peaks formed as said focusing lens is moved.

7. The focusing device according to claim 2, wherein an evaluation weight for the related observation area is reduced when the partial focus evaluation value calculated for each of said plurality of observation areas and for each position of said focusing lens exhibits a large number of peaks formed as said focusing lens is moved.

8. The focusing device according to claim 3, wherein an evaluation weight for the related observation area is reduced when the partial focus evaluation value calculated for each of said plurality of observation areas and for each position of said focusing lens exhibits a large number of peaks formed as said focusing lens is moved.

* * * * *